(12) United States Patent
Gettinger

(10) Patent No.: US 8,946,607 B2
(45) Date of Patent: Feb. 3, 2015

(54) MECHANISMS FOR DEPLOYING AND ACTUATING AIRFOIL-SHAPED BODIES ON UNMANNED AERIAL VEHICLES

(75) Inventor: Jonathan David Gettinger, Sainte Genevieve, MO (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 13/324,193

(22) Filed: Dec. 13, 2011

(65) Prior Publication Data

US 2013/0146716 A1 Jun. 13, 2013

(51) Int. Cl.
*F42B 15/01* (2006.01)

(52) U.S. Cl.
USPC ............................. 244/3.27; 244/39; 244/91

(58) Field of Classification Search
USPC ........ 244/3.27, 3.28, 3.29, 39, 49, 87, 88, 91, 244/99.3; 446/62, 66
See application file for complete search history.

(56) References Cited

U.S. PATENT DOCUMENTS

| | | | | |
|---|---|---|---|---|
| 2,580,176 | A | * | 12/1951 | Johnson ........................ 244/87 |
| 3,756,089 | A | * | 9/1973 | Haladay ........................ 74/96 |
| 3,826,448 | A | * | 7/1974 | Burk, Jr. ........................ 244/91 |
| 4,586,681 | A | * | 5/1986 | Wedertz et al. ................. 244/49 |
| 4,699,334 | A | | 10/1987 | Boeder |
| 5,671,899 | A | * | 9/1997 | Nicholas et al. ................ 244/49 |
| 5,816,532 | A | * | 10/1998 | Zasadny et al. .............. 244/3.29 |
| 5,839,698 | A | * | 11/1998 | Moppert ...................... 244/217 |
| 6,152,692 | A | * | 11/2000 | Aubry ............................ 416/24 |
| 6,186,443 | B1 | * | 2/2001 | Shaffer .......................... 244/49 |
| 6,978,970 | B2 | | 12/2005 | Purcell, Jr. |
| 7,841,559 | B1 | | 11/2010 | O'Shea |
| 2008/0217470 | A1 | * | 9/2008 | Zhao .......................... 244/99.3 |

* cited by examiner

*Primary Examiner* — Tien Dinh
*Assistant Examiner* — Michael Kreiner
(74) *Attorney, Agent, or Firm* — Ostranger Chong Flaherty & Broitman P.C.

(57) ABSTRACT

Deployment and control actuation mechanisms are incorporated in unmanned aerial vehicles having folding wings and/or folding canards and/or a folding vertical stabilizer. The folding canards and folding vertical stabilizer can be deployed using respective four-bar over-center mechanisms. Elevators pivotably mounted to the folding canards and a rudder pivotably mounted to the folding vertical stabilizer can be controlled by means of respective twist link mechanisms. The folding wings have respective wing roots that are driven by respective gas springs to pivot on bearings about a wing root hub having control servo wire paths.

15 Claims, 17 Drawing Sheets

US 8,946,607 B2

MECHANISMS FOR DEPLOYING AND ACTUATING AIRFOIL-SHAPED BODIES ON UNMANNED AERIAL VEHICLES

BACKGROUND

This disclosure generally relates to mechanisms for deploying and actuating airfoil-shaped bodies on compressed carriage unmanned aerial vehicles. In particular, this disclosure relates to mechanisms for deploying wings, canards or vertical stabilizers and mechanisms for actuating trailing edge control surfaces on compressed carriage unmanned aerial vehicles.

Unmanned surveillance air vehicles, glide munitions, winged missiles, and other types of unmanned aerial vehicles (UAVs) are sometimes configured to be carried internally or externally on a larger mother aircraft (or a submarine). Because the carried UAV itself is usually small and typically has a limited range, it is flown to a location near to where it is to perform its mission, as cargo on the mother aircraft, and then air launched to perform the mission. The carried UAV may later be recovered, or it may be considered expendable and destroyed at the completion of the mission.

A known carried UAV has laterally extending wings and canards and a vertical stabilizer which, in the absence of foldability, would make it awkward to store the carried UAV on the mother aircraft or submarine. To facilitate the internal or external storage and transport on the mother aircraft or submarine, the carried UAV may be provided with folding wings, canards and vertical stabilizer. The folding wings, canards and vertical stabilizer are in storage positions during carriage, and then are unfolded to a deployed flight position shortly after launch from the mother aircraft or submarine. The UAV is launched from a mother aircraft at high speed in a compressed carriage state. First a balloon is inflated to slow down the UAV and then a parachute is deployed to stabilize the UAV. The folded wings, canards and vertical stabilizer are then deployed and the engine of the UAV is started. The UAV is then able to fly under remote control by the mother aircraft. The UAV could also be controlled by a remote ground control station, ship, submarine, etc.

There is a need for improved mechanisms for deploying folding wings, canards and vertical stabilizers and actuating control surfaces on UAVs of the foregoing type.

SUMMARY

The deployment and control actuation mechanisms disclosed herein can be incorporated in UAVs having folding wings and/or folding canards and/or a folding vertical stabilizer. In accordance with various aspects of the disclosed subject matter, the folding canards and folding vertical stabilizer can be deployed using respective four-bar over-center mechanisms. In accordance with other aspects of the disclosed subject matter, elevators pivotably mounted to the folding canards and a rudder pivotably mounted to the folding vertical stabilizer can be controlled by means of respective twist link mechanisms. In accordance with further aspects, the folding wings have respective wing roots that are driven by respective linear actuators to pivot on bearings about a wing root hub having control servo wire paths.

The folding wing mechanism comprises a low-profile, low-friction, self-powered high-load-capacity wing opening mechanism and a compact wing lock mechanism that permit a small air/submarine-launched UAV to compress into a small package by folding and locking the wings beneath the UAV fuselage. Once the UAV is launched, a locking mechanism for locking the wings in the stowed condition is unlocked and then linear actuators drive the wings open independently and passively. The locking mechanism then locks the wings in the deployed condition. The mechanism is strong enough to support air loads and wing hook recovery loads. This mechanism permits folding of a small UAV wing assembly for compressed carriage and subsequent air- or sub-launched deployment. It permits a small UAVs wings to compress into an efficient packaging scheme for fitment into a small launch container, rapid deployment, and high load aircraft recovery via rope capture by a wing mounted hook. The mechanism also permits a path for the aileron/flap control servo wires to pass through the mechanism and into the wings to the control servos in the folded and deployed conditions. The wing deployment mechanism, lock mechanism, and deployment actuator are all self contained within the wing root.

The folding canard mechanism comprises a spring-driven four-bar over-center mechanism for canard deployment, that employs a twist link mechanism for elevator operation. The combination of these two mechanisms allows for rapid deployment of a compressed carriage small tactical UAV with quarter-chord elevator operation. These mechanisms permit folding of a small UAV canard/elevator for compressed carriage and subsequent air- or sub-launched deployment. They permit a small UAV with canards to compress into an efficient packaging scheme for fitment into a small launch container, rapid deployment and elevator control surface operation once uncompressed.

The folding vertical stabilizer mechanism provides means for folding a compressed carriage UAV vertical stabilizer, including the vertical stabilizer deployment mechanism, stowed and deployed locking mechanisms and rudder control actuation mechanisms. These mechanisms permit folding of a small UAV vertical stabilizer for compressed carriage and subsequent air- or submarine-launched deployment. They permit a small UAV to compress into an efficient packaging scheme for rapid deployment and rudder operation once uncompressed.

In view of the foregoing, one aspect of the subject matter disclosed herein is an unmanned aerial vehicle comprising a fuselage, a deployment mechanism supported by the fuselage, and a folding airfoil-shaped body attached to the deployment mechanism, wherein the deployment mechanism comprises first and second links which are pivotably coupled to each other, the folding airfoil-shaped body being in a stowed position when the first and second links are not aligned with each other and the folding airfoil-shaped body being in a deployed position when the first and second links are aligned with each other.

Another aspect of the subject matter disclosed herein is an unmanned aerial vehicle comprising a fuselage, a first airfoil-shaped body that is rotatable relative to the fuselage from a stowed position to a deployed position, an actuation mechanism supported by the fuselage, and a second airfoil-shaped body pivotably coupled to a trailing edge of the first airfoil-shaped body, wherein the actuation mechanism comprises a motor, a first arm coupled to the motor, a second arm coupled to the second airfoil-shaped body, and a twist link that couples the first and second arms to each other, an angle of the second airfoil-shaped body relative to the first airfoil-shaped body being adjustable in response to movement of the first arm.

A further aspect of the subject matter disclosed herein is an unmanned aerial vehicle comprising a fuselage, a deployment mechanism supported by the fuselage, and a wing attached to the deployment mechanism, wherein the deployment mechanism comprises a wing root hub attached to the fuselage, a wing root pivotably coupled to the wing root hub, and an actuator pivotably coupled to the wing root hub and to the wing root at opposite ends thereof, wherein the wing is attached to the wing root and rotates from a stowed position to a deployed position in response to extension of the actuator.

BRIEF DESCRIPTION OF THE DRAWINGS

Various embodiments will be hereinafter described with reference to the drawings for the purpose of illustrating the foregoing and other aspects of the disclosed subject matter.

Reference will hereinafter be made to the drawings in which similar elements in different drawings bear the same reference numerals.

DETAILED DESCRIPTION

Figure 1:
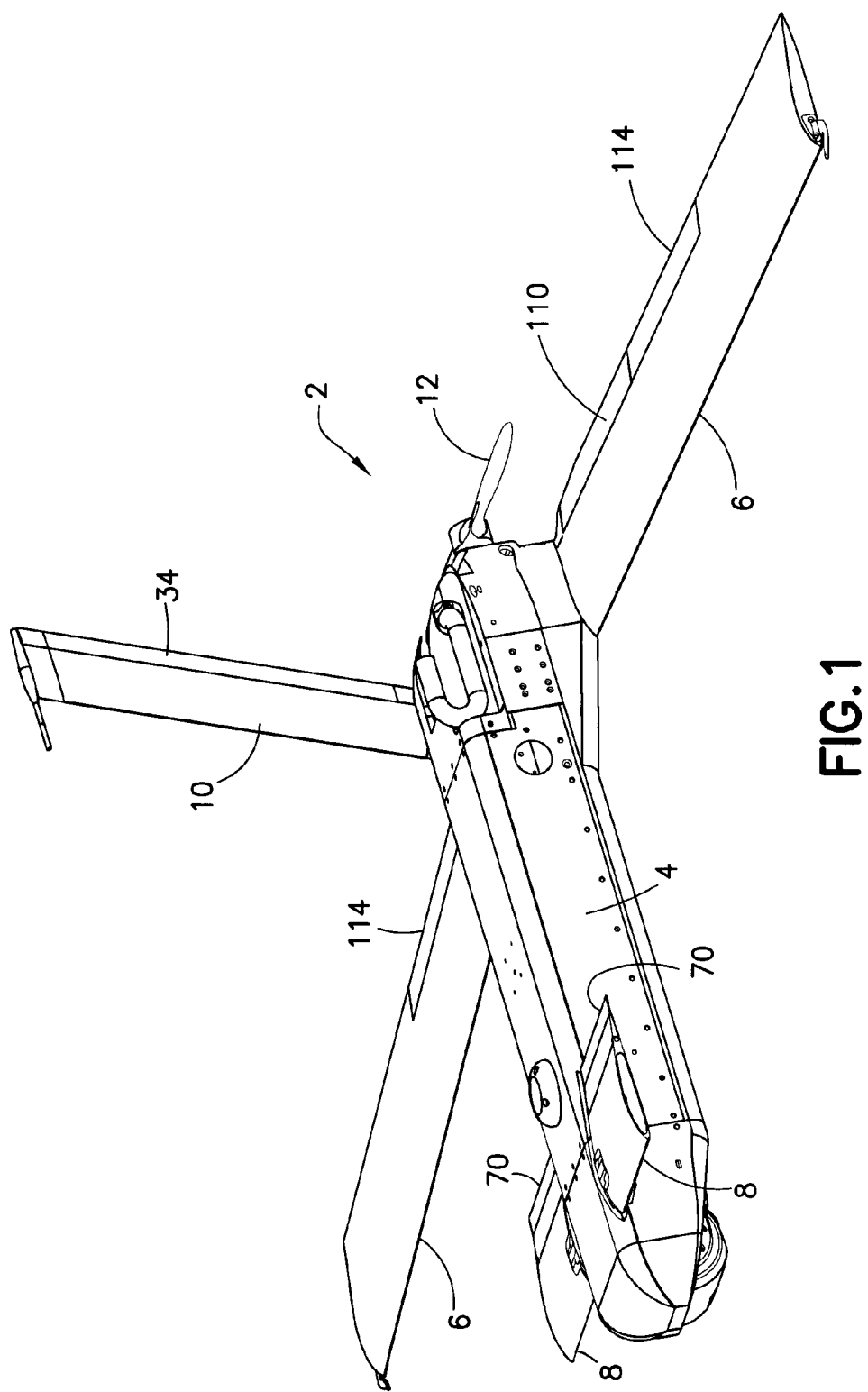
FIGS. 1 and 2 are diagrams showing isometric views of a UAV having folding wings, folding canards and a folding vertical stabilizer in deployed and stowed positions respectively in accordance with one embodiment.
Figure 2:
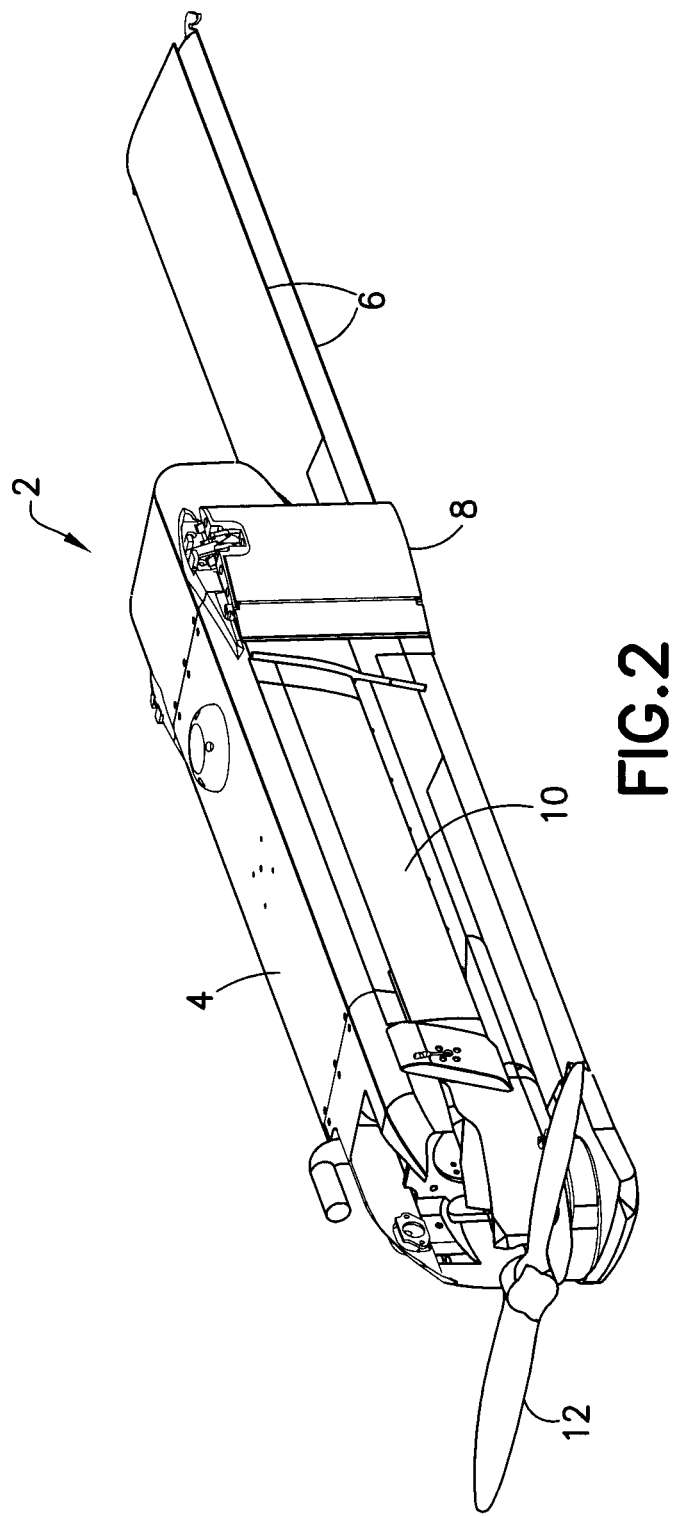

FIGS. 1 and 2 show a UAV 2 comprising a fuselage 4, a pair of folding wings 6, a pair of folding canards 8, a folding vertical stabilizer 10, and a propeller 12. FIG. 1 shows the UAV with the folding wings, canards and vertical stabilizer deployed; FIG. 2 shows the UAV with the folding wings, canards and vertical stabilizer folded, i.e., stowed for compressed carriage. Each of the folding airfoil-shaped bodies has a respective deployment mechanism not shown in FIGS. 1 and 2. The vertical stabilizer 10 has a rudder 34 pivotably mounted to its trailing edge. Each canard 8 has an elevator 70 coupled to its trailing edge. Each wing 6 also has an inboard flap 110 and an outboard aileron 114 pivotably coupled to the trailing edge of the wing.

The deployment mechanism for the folding vertical stabilizer 10 (which is described in detail below with reference to FIGS. 4-6) causes the stowed vertical stabilizer shown in FIG. 2 to pivot about an axis that is generally normal to the stowed vertical stabilizer, the vertical stabilizer rotation being stopped when the vertical stabilizer is vertical or nearly vertical, as seen in FIG. 1. The deployment mechanism for each folding canard 8 (which is described in detail below with reference to FIGS. 9-12) causes the stowed canard 8 shown in FIG. 2 to pivot about an axis that is generally parallel to the longitudinal axis of the fuselage 4 (and perpendicular to the vertical stabilizer pivot axis), the canard rotation being stopped when the canards extend laterally in a horizontal plane, as seen in FIG. 1. The deployment mechanism for each folding wing 6 (which is described in detail below with reference to FIGS. 14-17) causes the stowed wings shown in FIG. 2 to pivot about an axis that is generally perpendicular to the pivot axes of the vertical stabilizer and of the canards, the wing rotation being stopped when the canards extend laterally or nearly laterally in a horizontal plane, as seen in FIG. 1.

Figure 3:
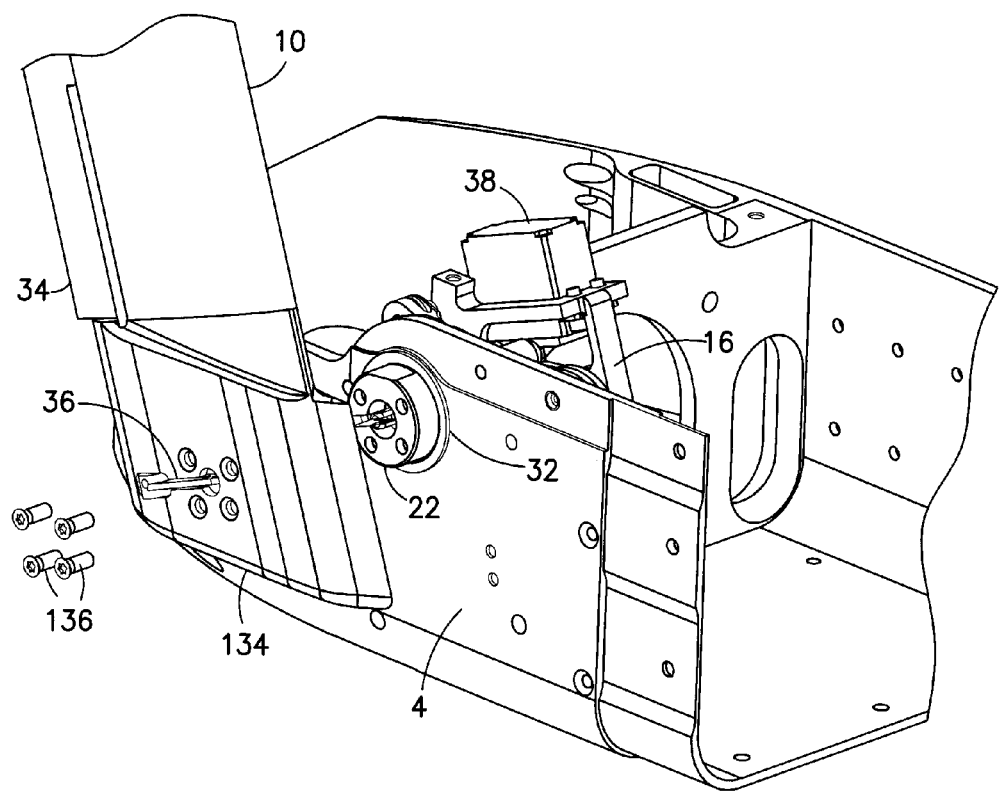
FIG. 3 is a diagram showing an isometric view of a portion of a vertical stabilizer/rudder that has been removed from the vehicle.

FIG. 3 shows a portion of a vertical stabilizer 10 that has been removed from the vehicle. A rudder 34 is pivotably coupled to the trailing edge of the vertical stabilizer. A vertical stabilizer deployment mechanism comprising a frame 16 is mounted on the inside of the fuselage 4 and supports a rudder control servo 38. The vertical stabilizer deployment mechanism comprises a hub shaft 22 that projects outside the fuselage 4 and to which the root 134 of vertical stabilizer 10 is fastened by means of screws 136. When the vertical stabilizer root 134 is fastened to hub shaft 22 and in a stowed position (see FIG. 2), the deployment mechanism can be unlocked to cause the vertical stabilizer to rotate from the stowed position to a deployed position (see FIG. 1). Item 36 in FIG. 3 is a rudder control input arm that has been removed from the vehicle. The position and function of rudder control input arm 36 will be described later with reference to FIGS. 6 and 7.

Figure 4:
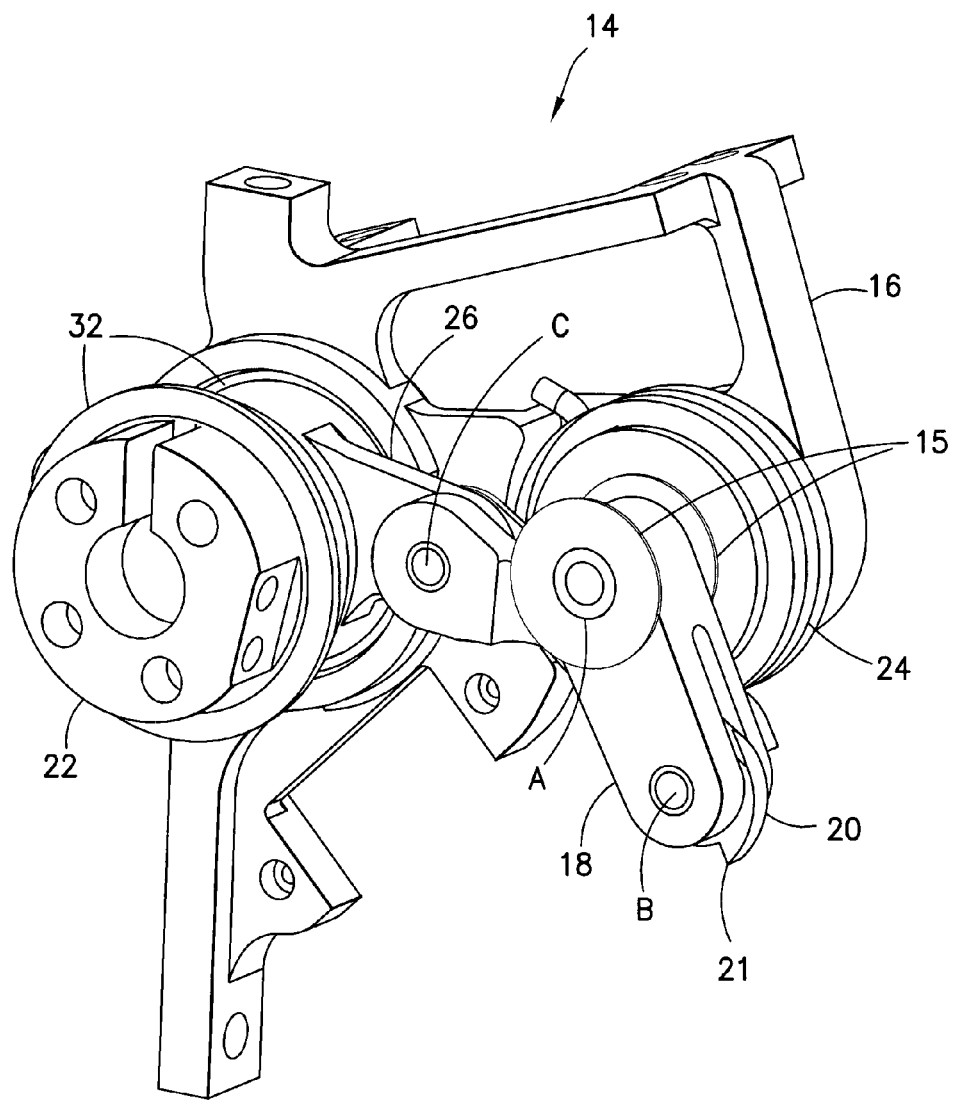
FIGS. 4 and 5 are diagrams showing isometric views of a vertical stabilizer deployment mechanism comprising a four-bar over-center mechanism shown in a vertical stabilizer stowed state in FIG. 4 and in a vertical stabilizer deployed state in FIG. 5.
Figure 5:
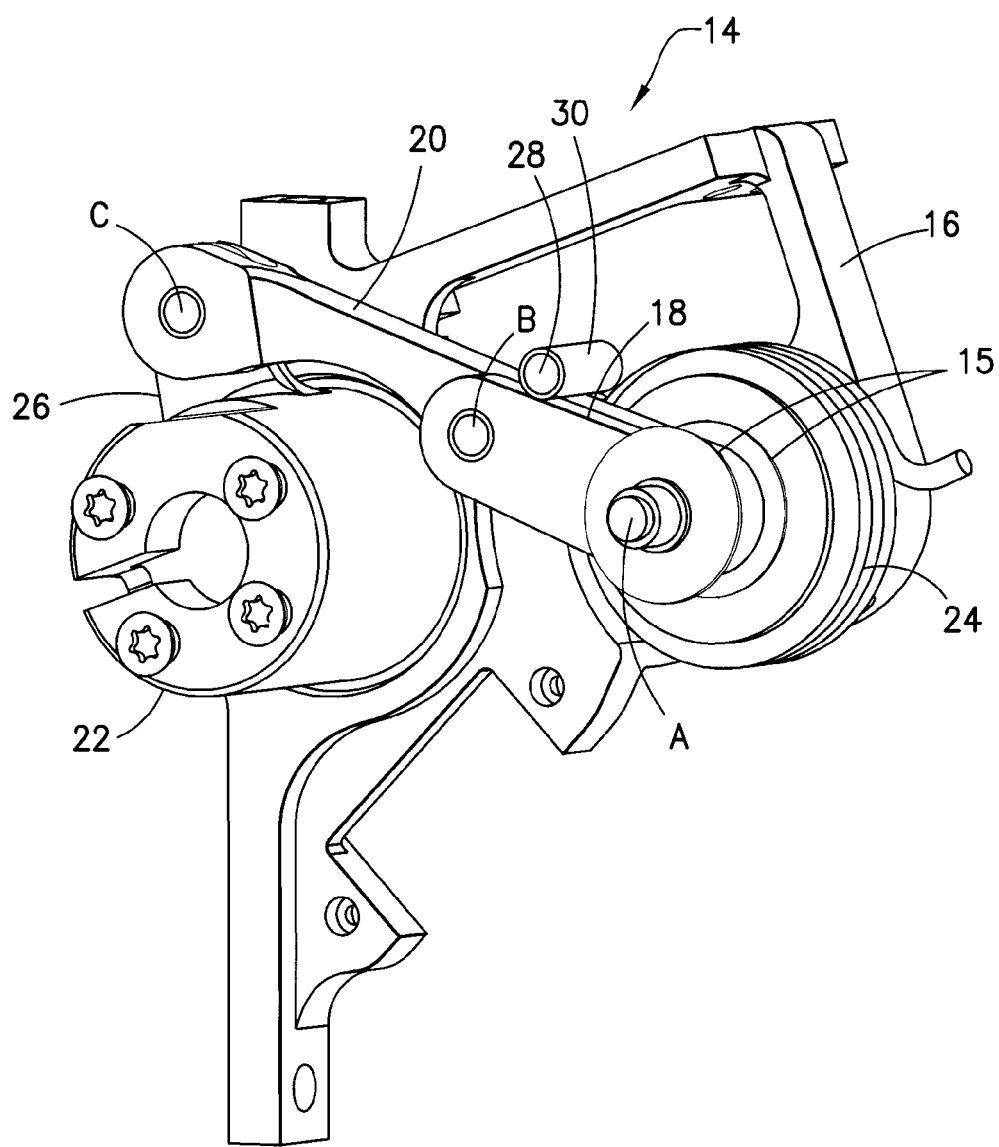

FIGS. 4 and 5 show the vertical stabilizer deployment mechanism in accordance with one embodiment. This vertical stabilizer deployment mechanism comprises a four-bar (i.e., four-link) over-center mechanism 14, which is shown in a vertical stabilizer stowed state in FIG. 4 and in a vertical stabilizer deployed state in FIG. 5. The four links include a vertical stabilizer mechanism frame 16 (third link), a vertical stabilizer input link 18 (first link) has one end pivotably coupled to vertical stabilizer mechanism frame 16 by joint A (with the aid of washers 15), a connecting link 20 (second link) has one end pivotably coupled to a clevis end of vertical stabilizer input link 18 by joint B, and a vertical stabilizer root hub (fourth link) comprising a large-diameter vertical stabilizer root hub shaft 22 and an arm 26 pivotably coupled to a clevis end of connecting link 20 by joint C. The vertical stabilizer root hub shaft 22, which serves as the vertical stabilizer folding joint, is also pivotably coupled to vertical stabilizer mechanism frame 16 and fuselage 4 by a pair of pivot bushings 32. The folding vertical stabilizer (not shown in FIGS. 4 and 5) is attached to the vertical stabilizer root hub shaft 22 and rotates as the vertical stabilizer root hub rotates.

The over-center mechanism 14 is unlocked by activation of an unlock servo (not shown in the drawings) that controls a vertical stabilizer lock arm (not shown in the drawings) to disengage from a lock hook 21 on connecting link 20 (see FIG. 4). The over-center mechanism 14, when unlocked, is driven by a torsion spring 24, one end of which bears against a protruding portion (not visible in FIG. 4) of joint B disposed behind vertical stabilizer input link 18. The torsion spring 24 drives the over-center mechanism 14 from a first state (shown in FIG. 4) whereat the folding vertical stabilizer is in a stowed position to a second state (shown in FIG. 5) whereat the folding vertical stabilizer is in a deployed position. More specifically, the torsion spring 24 causes vertical stabilizer input link 18 to rotate clockwise (in the view of FIG. 4), which clockwise motion is converted to counterclockwise rotation of the vertical stabilizer root hub (and attached vertical stabilizer) via the connecting link 20.

The over-center mechanism 14 and the deployment torsion spring 24 reside internal to the fuselage (not shown). Once unlocked from the stowed position, the torsion spring 24 drives mechanism 14 open, causing vertical stabilizer input link 18 to rotate and connecting link 20 to rotate/translate. Links 18 and 20 only stop translating/rotating when link 18 impacts a stop bolt 28 (shown in FIG. 5), which is bolted to the fuselage (not shown in FIG. 5). Rubber tubing 30 is added to snub impact forces and absorb the kinetic energy of links 18 and 20. As seen in FIG. 5, when the over-center mechanism 14 locks itself in the vertical stabilizer deployed position, joints A, B and C are aligned. Once over-center, no amount of force on the vertical stabilizer will permit the mechanism to unlock.

The indirect drive of vertical stabilizer root hub shaft (output link) 22 by torsion spring 24 on a four-bar input link allows the mechanism to lock in an over-center condition just as the vertical stabilizer reaches full deployment. This combines the deployment mechanism and the deployed locking mechanism into an efficient and compact design. Additionally, the inherent nature of a four-bar over-center mechanism is that the output link (the vertical stabilizer root hub) approaches zero velocity as the mechanism approaches the over-center condition. This prevents the output link from impacting a mechanical stop and prevents the large impulse loads of the direct drive system. The large-diameter vertical stabilizer root hub shaft 22 distributes the aerodynamic loads on the vertical stabilizer into the aircraft structure more efficiently, and reduces stress on the mechanism. Additionally, the large diameter allows hollowing of the root hub, which permits the rudder control mechanism to be routed through the root hub and to the rudder.

Figure 6:
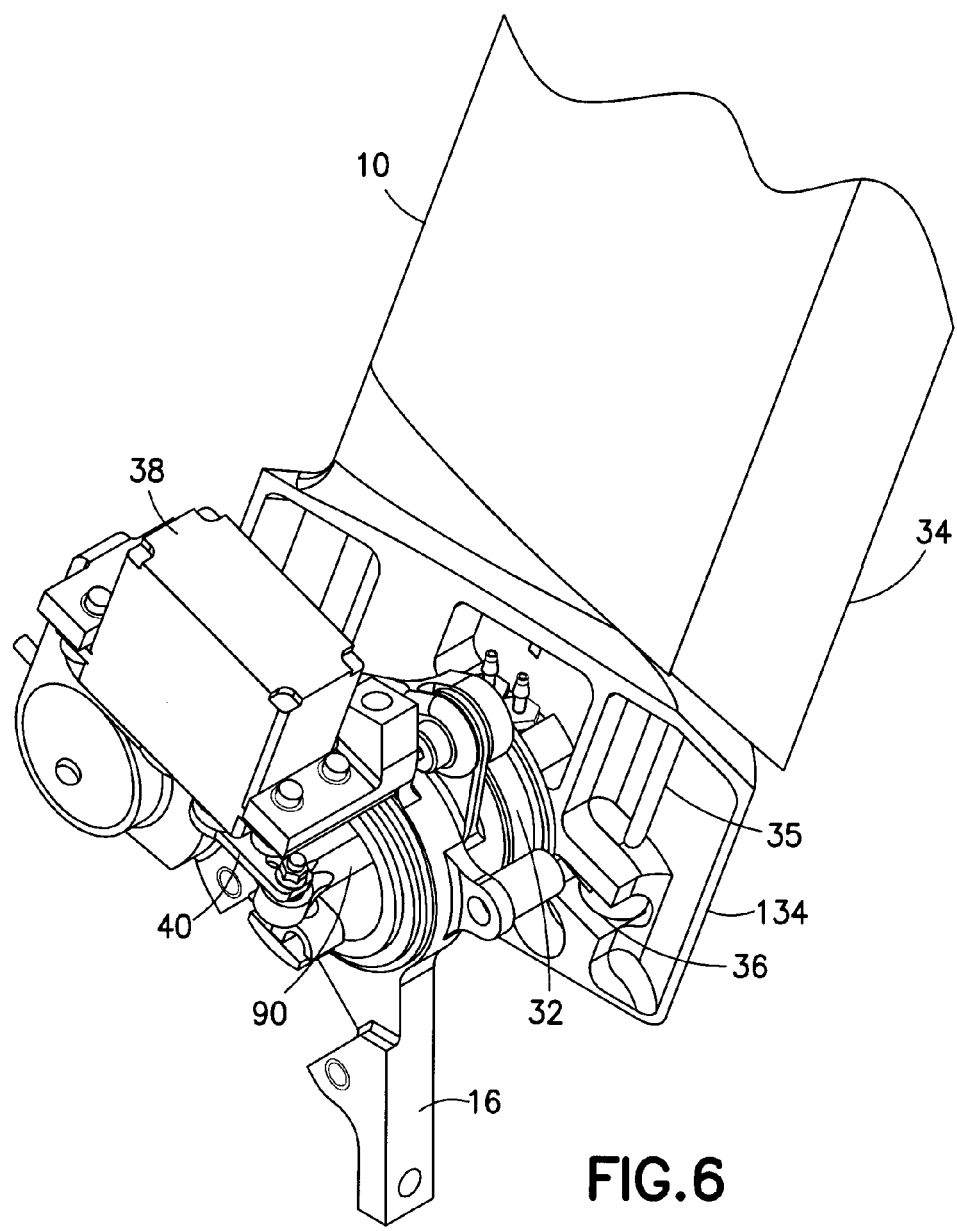
FIG. 6 is a diagram showing the relationship of the attached vertical stabilizer/rudder to the deployment mechanism depicted in FIGS. 4 and 5. The fuselage has been removed.
Figure 7:
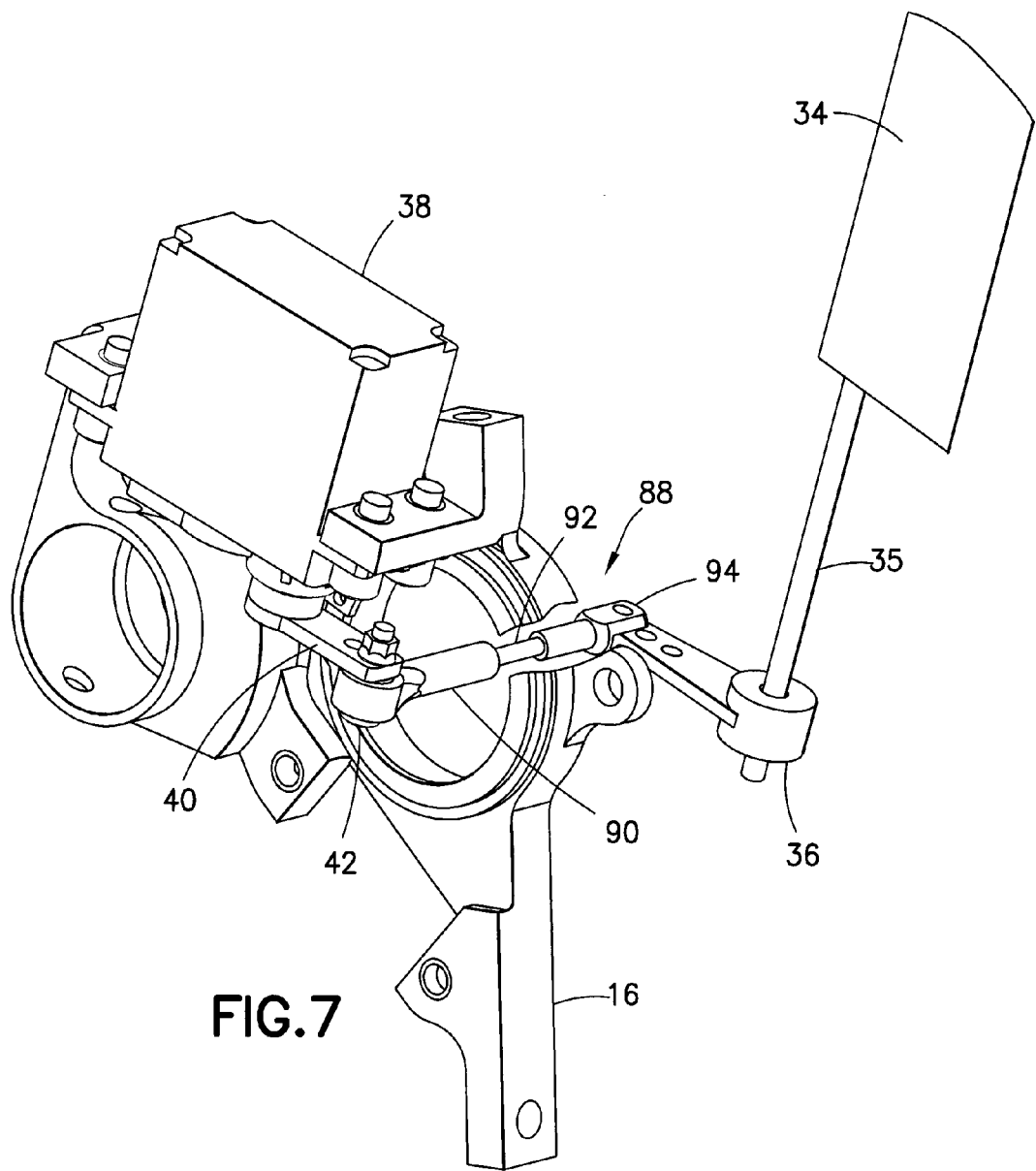
FIG. 7 is a diagram showing an isometric view of a rudder control actuation mechanism comprising a twist link with mono-ball and clevis rod ends, which permits rudder control in unison with vertical stabilizer deployment. A portion of a frame has been removed to show portions of a twist link that would otherwise be hidden.

FIGS. 6 and 7 shows a rudder control actuation mechanism comprising a twist link 88 which permits control of a rudder 34 (pivotably coupled to the vertical stabilizer 10) in unison with vertical stabilizer deployment. This is done by mounting the rudder control servo 38 internal to the UAV fuselage with the servo crank arm 40 in plane with a rudder control input arm 36 in the vertical stabilizer deployed condition. The rudder control input arm 36 is installed within the root 134 of the vertical stabilizer 10 and is fixedly connected to the pivotable rudder 34 by a rod 35. The twist link 88 connects the servo crank arm 40 to the rudder control input arm 36 and is concentric with the vertical stabilizer root hub shaft centerline. This permits the vertical stabilizer 10 to fold and deploy without affecting the rudder control actuation mechanism.

The twist link 88 comprises a threaded rod 92, a mono-ball rod end 90 threadably coupled to one end of threaded rod 92 and a clevis rod end 94 threadably coupled to the other end of threaded rod 92. The axis of threaded rod 92 lies along the vertical stabilizer root hub shaft centerline. A distal end of servo crank arm 40 is coupled to the mono-ball of mono-ball rod end 90 by a screw 42. The clevis rod end 94 is pivotably coupled to one end of the rudder control input arm 36. The angle of rudder 34 can be controlled by rudder control servo 38 by means of the servo crank arm 40, the twist link 88 and the rudder control input arm 36, i.e., any rotation of servo crank arm 40 causes rudder 34 to rotate about its pivot axis.

The mono-ball rod end 90 consists of a spherical ball with a hole through it that fits into a socket that forms a ball-in-socket type of joint. The socket that the mono-ball fits into also contains female threads such that it can be attached to one end of threaded rod 92. A mono-ball rod ends is also commonly known as a "rod end bearing" or a "helm joint". A mono-ball rod end is a joint that allows translation and rotation of a link where one end is out of plane with the other end. A mono-ball rod end is limited in the amount of out-of-plane motion that can be made because the fastener that passes through the spherical ball will eventually interfere with the sides of the socket. The rudder control actuation mechanism shown in FIG. 7 employs a twist link 88 that uses one female threaded mono-ball rod end 90 and one female threaded clevis rod end 94 screwed onto opposing ends of a length of threaded rod 92. Only one rod end needs to be rotatable relative to the threaded rod 92, so the other rod end can be locked to the threaded rod with a jam nut. This allows rod ends 90 and 94 to rotate relative to each other about the axis of threaded rod 92.

The axis of twist link 88 lies on the axis of rotation for the deployment mechanism. When the deployment of the vertical stabilizer occurs, the rudder control actuation mechanism twist link 88 simply allows the two rod ends 90 and 94 to rotate about the axis of rotation of the deployment mechanism. In this manner, no "input" to rudder 34 is made during deployment. (A slight input is made since the twist link 88 grows slightly in length due to the threaded rod ends rotating, but this input is negligible.)

Figure 8:
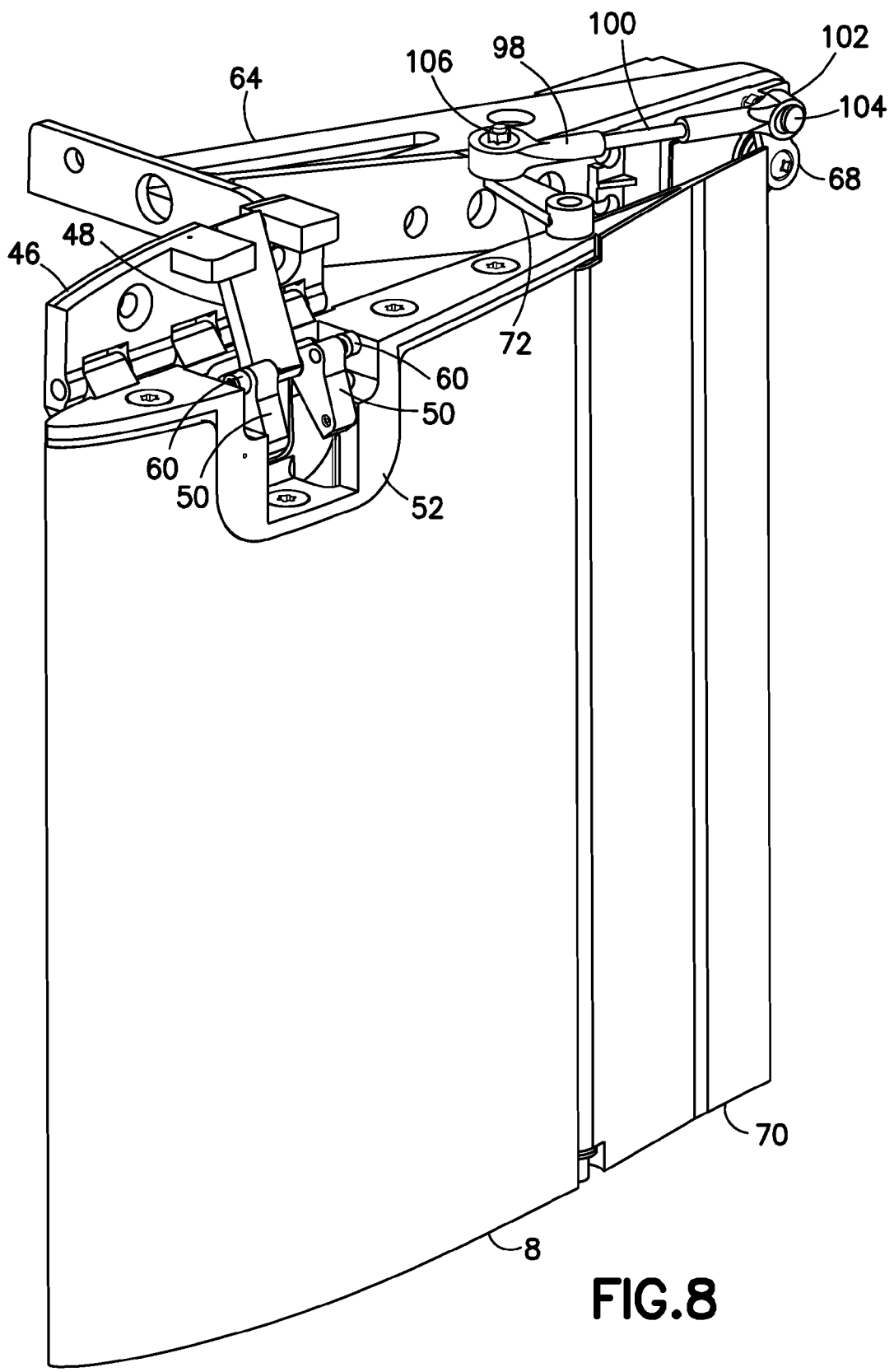
FIG. 8 is a diagram showing an isometric view of a canard/elevator assembly in accordance with one embodiment.

FIG. 8 shows a canard/elevator assembly in accordance with one embodiment. The canard 8 is attached to a canard deployment mechanism comprising a folding canard root 46 attached to the fuselage (not shown), a connecting link 48 pivotably coupled to folding canard root 46, a pair of folding canard tumblers 50 pivotably coupled to connecting link 48, and a folding mechanism frame 52 pivotably coupled to tumblers 50. The canard deployment mechanism will be described below in more detail with reference to FIGS. 9-12. The elevator 70 is pivotably coupled to the trailing edge of the canard 8. The angle of the elevator 70 is controlled by an elevator control actuation mechanism comprising an elevator servo mounted to a canard servo bracket 64, which is also attached to the fuselage. The elevator control actuation mechanism comprises a twist link that connects a servo crank arm 68 to an elevator control input arm 72. The twist link comprises a threaded rod 100, the ends of which are respectively threadably coupled to first and second mono-ball rod ends 98 and 102. One end of elevator control input arm 72 is coupled to mono-ball rod end 98 by a screw 106, while one end of servo crank arm 68 is coupled to mono-ball rod end 102 by a screw 104. The elevator control actuation mechanism will be described below in more detail with reference to FIG. 13.

FIGS. 9-12 show the canard deployment mechanism in accordance with one embodiment. Each canard has its own canard deployment mechanism. The canard deployment mechanism comprises a four-bar (i.e., four-link) over-center mechanism 44 driven by two tension springs 54 (see FIG. 9) mounted internal to the canard structure. This four-bar over-center mechanism 44 is shown in a canard stowed state in FIGS. 9 and 10, in an intermediate state in FIG. 11, and in a canard deployed state in FIG. 12. The four links include a folding canard root 46 (third link), a connecting link 48 (first link) pivotably coupled to folding canard root 46 by a joint (not visible in the drawings), a pair of folding canard tumblers 50 (second link) pivotably coupled to connecting link 48 by respective joints D (only one of which is visible in FIG. 11), and a folding mechanism frame 52 (fourth link) pivotably coupled to tumblers 50 by respective joints E (only one of which is visible in FIG. 10). The folding mechanism frame 52 is also pivotably coupled to folding canard root 46 by a piano hinge 62 (best seen in FIG. 10), which serves as the canard folding joint. The folding canard (not shown in FIGS. 9-12) is attached to the folding mechanism frame 52 and deploys as the folding mechanism frame 52 pivots.

The over-center mechanism 44 is unlocked by means of known stowed lock mechanisms with slider release to release a hook, which arrangement is not shown in the drawings. This method is used to retain the folding canards in the compressed (stowed) condition until an unlock servo (not shown in the drawings) is signaled to release them.

Figure 9:
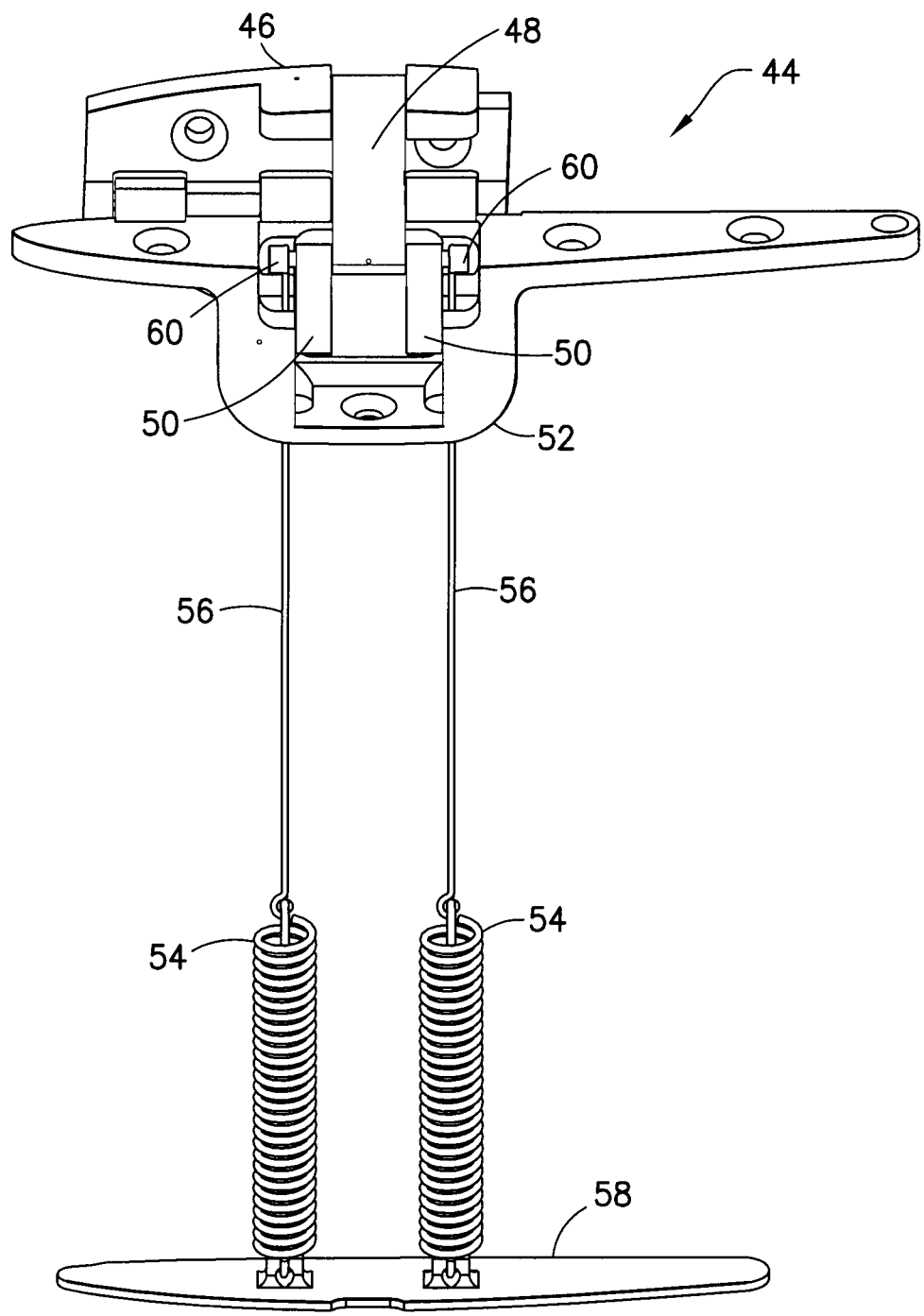
FIG. 9 is a diagram showing an isometric view of a canard deployment mechanism comprising a four-bar over-center mechanism and deployment springs which reside internal to the canard aerodynamic surface.

Referring to FIG. 9, the over-center mechanism 44, when unlocked, is driven to open by the pair of tension springs 54, the distal ends of which are attached to a spring retainer 58 that is fixed relative to the canard structure. The proximate ends of tension springs 54 are connected via respective spring extensions 56 to respective spring attachment screws 60 screwed into respective tumblers 50. The tension springs 54 drive the over-center mechanism 44 from a first state (shown in FIG. 10) whereat the folding canard is in a stowed position to a second state (shown in FIG. 12) whereat the folding vertical stabilizer is in a deployed position. More specifically, the tension springs 54 cause tumblers 50 to rotate counter-clockwise (in the view of FIG. 10), which counterclockwise motion is converted to counterclockwise rotation of connecting link 48 and folding mechanism frame 52 (and attached canard).

The over-center mechanism 44 and the deployment tension springs 54 reside internal to the canard aerodynamic surface (not shown in FIGS. 9-12). Once unlocked from the stowed position, the tension springs 54 drives mechanism 44 open, causing connecting link 48 to rotate and tumblers 50 to rotate/translate. Although not visible in FIG. 12, when the over-center mechanism 44 locks itself in the canard deployed position, joints D and E and the joint where connecting link 48 is pivotably coupled to folding canard root 46 are aligned.

Figure 10:
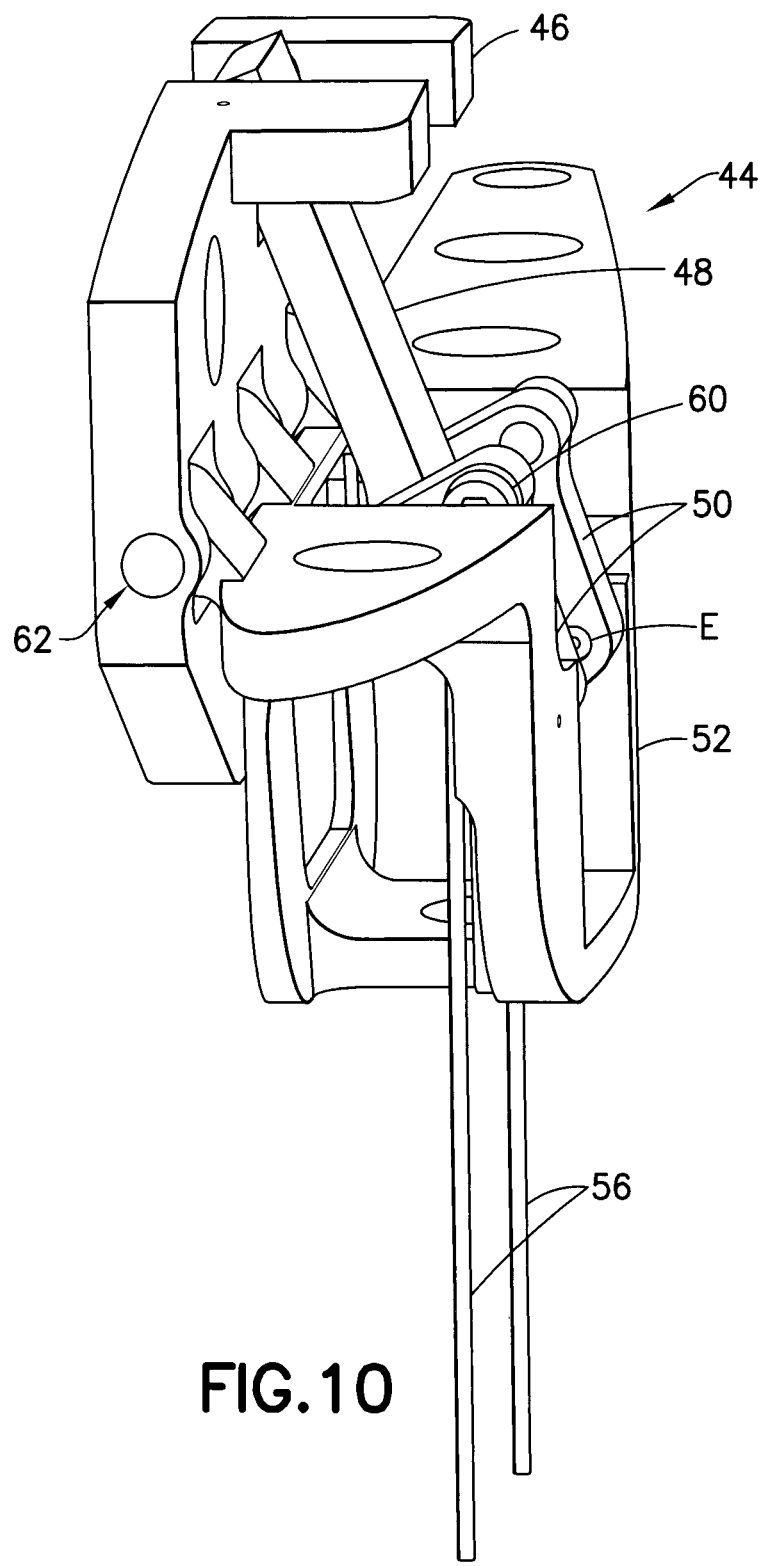
FIGS. 10-12 are diagrams showing isometric views of a canard deployment mechanism comprising a four-bar over-center mechanism shown in a canard stowed state in FIG. 10, in an intermediate position in FIG. 11 and in a canard deployed state in FIG. 12.
Figure 11:
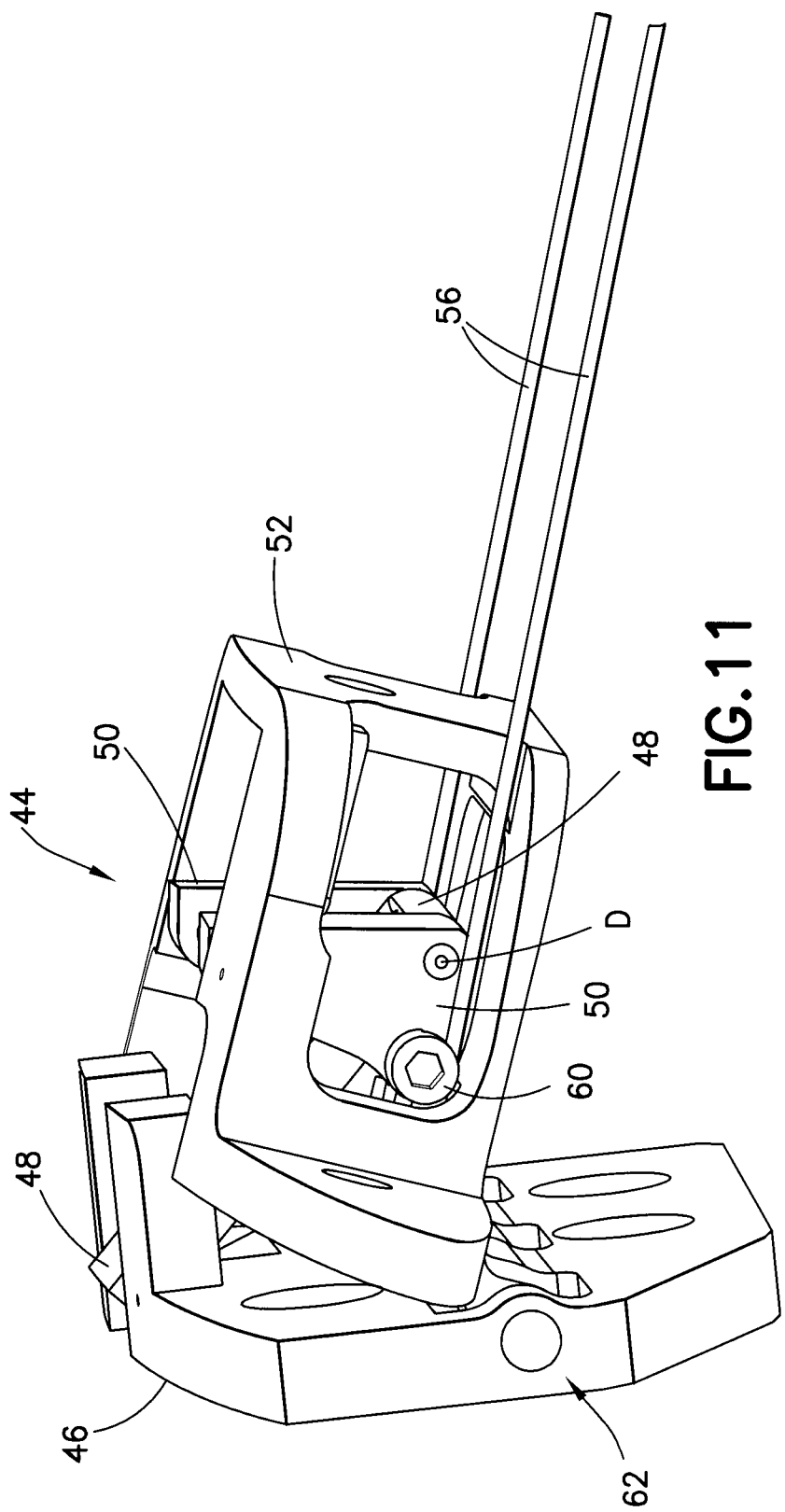
Figure 12:
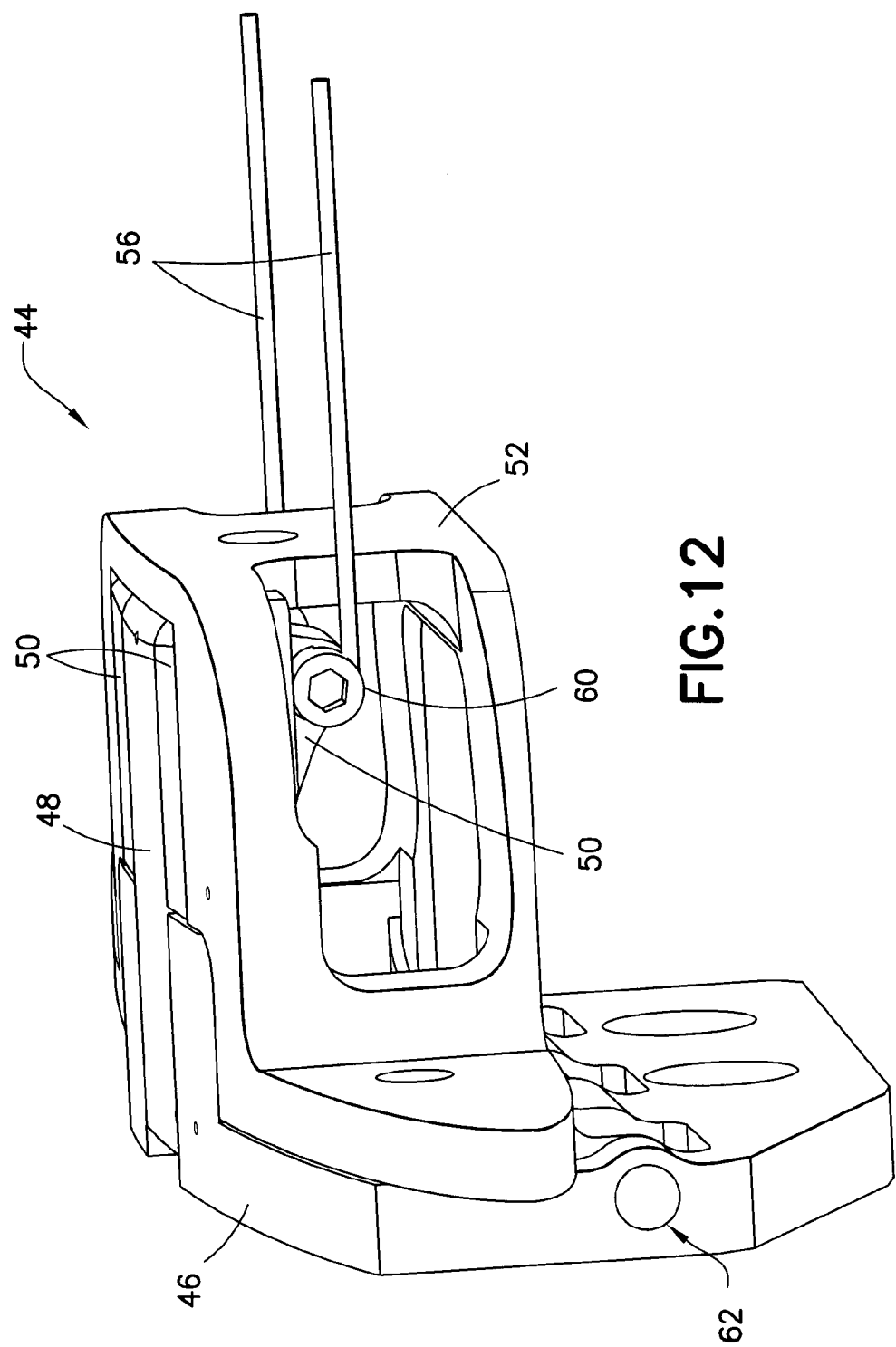

The canard hinges about a small-diameter piano hinge 62 (see FIG. 10). The piano hinge 62 resides internal to the fuselage profile such that none of the canard lifting surface is sacrificed to the hinge. Indirect drive of the canard folding mechanism frame (output link) 52 by tension springs 54 pulling on folding canard tumblers 50 allows the mechanism to lock over-center just as the canard reaches full deployment. The four-bar over-center mechanism 44 combines the deployment mechanism and the deployed lock mechanism into an efficient and compact design. This eliminates the need for a separate deployed lock mechanism. Additionally, the inherent nature of a four-bar over-center mechanism is that the output link (folding mechanism frame 52 and canard) approaches zero velocity as the mechanism approaches the over-center condition. This prevents the canard mechanism from impacting a mechanical stop with the inertia of the entire canard, and eliminates the need to increase the size of the mechanism in order to handle the impact loads. Once over-center, no amount of force on the canard will permit the mechanism to unlock. The spring force keeps the mechanism over-center in the canard deployed position.

Figure 13:
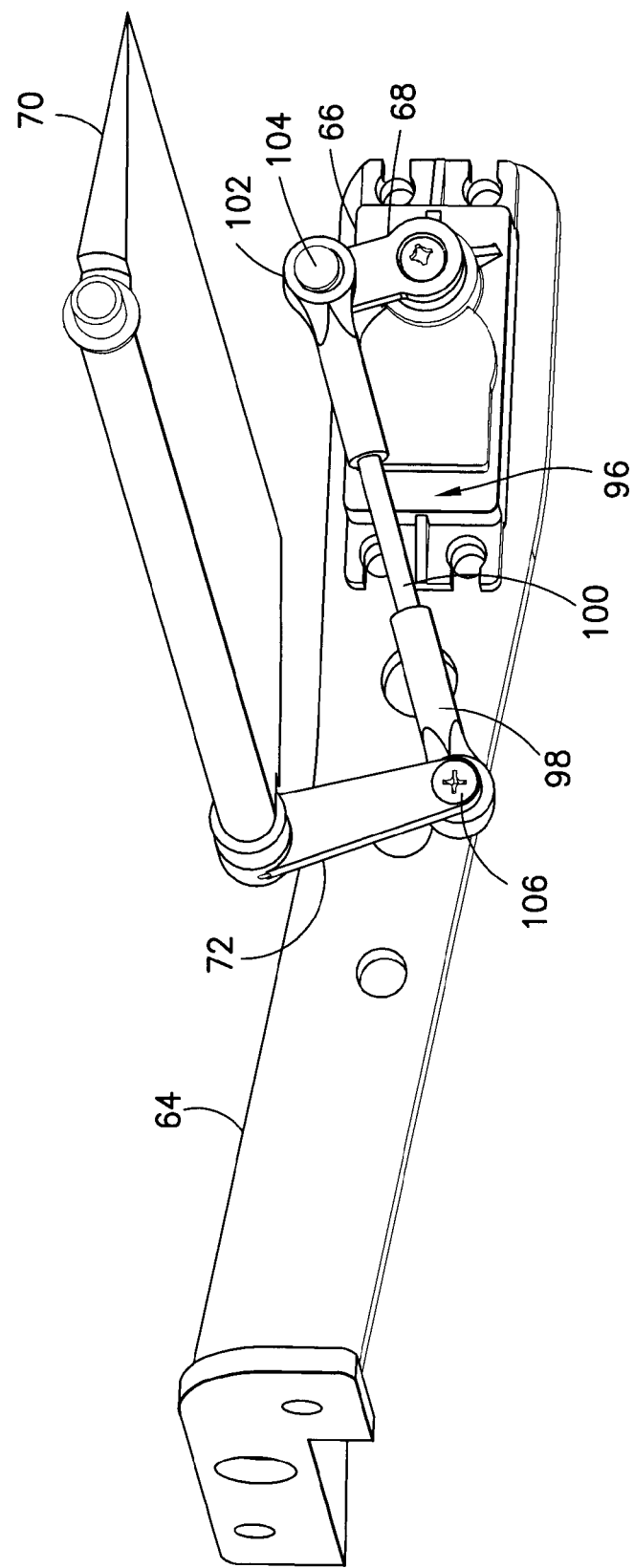
FIG. 13 is a diagram showing an isometric view of an elevator control actuation mechanism comprising a twist-link with mono-ball rod ends, which permits ¼-chord elevator control in unison with canard deployment.

FIG. 13 shows an elevator control actuation mechanism comprising a twist link 96 which permits control of a ¼-chord elevator 70 (pivotably coupled to the canard) in unison with canard deployment. The twist link 96 connects the servo crank arm 68 to the elevator control input arm 72. The twist link 96 comprises a threaded rod 100, a first mono-ball rod end 98 threadably coupled to one end of threaded rod 100 and a second mono-ball rod end 102 threadably coupled to the other end of threaded rod 100. Only one mono-ball rod end needs to be rotatable relative to the threaded rod 100, so the other mono-ball rod end can be locked to the threaded rod with a jam nut. This allows mono-ball rod ends 98 and 102 to rotate relative to each other about the axis of threaded rod 100. A distal end of servo crank arm 68 is coupled to the mono-ball of the second mono-ball rod end 102 by a screw 104. A proximal end of elevator control input arm 72 is coupled to the mono-ball of the first mono-ball rod end 98 by a screw 106. The angle of elevator 70 can be controlled by elevator control servo 66 by means of the servo crank arm 68, the twist link 96 and the elevator control input arm 72, i.e., any rotation of servo crank arm 68 causes elevator 70 to rotate about its pivot axis.

The twist link 96 permits rotation of the canard during deployment while the mono-ball rod ends allow the rudder control actuation mechanism to sweep an out-of-plane conic shape and maintain positive connection. By mounting the control actuation servo mono-ball along the canard piano-hinge line, little to no input to the elevator control surface occurs during canard deployment, and the control linkage and servo resides entirely within the fuselage. This quarter-chord elevator folding canard technique is only possible because the canard piano hinge (item 62 in FIG. 10) resides internal to the fuselage profile.

The twist link 96 for the elevator 70 is employed in a similar manner as the twist link for the rudder, but here only the input end of the twist link lies on the axis of rotation of the deployment mechanism. So now during deployment, the control actuation twist link rod ends rotate approximately 90 degrees relative to each other and also the rod sweeps out a conic. The placement of the input mono-ball on the axis of rotation of the canard (or as close as possible) prevents any uncommanded input to the elevator due to canard rotation during deployment. (Again a small input is made because the twist link grows in length slightly, but this is negligible.)

Figure 14:
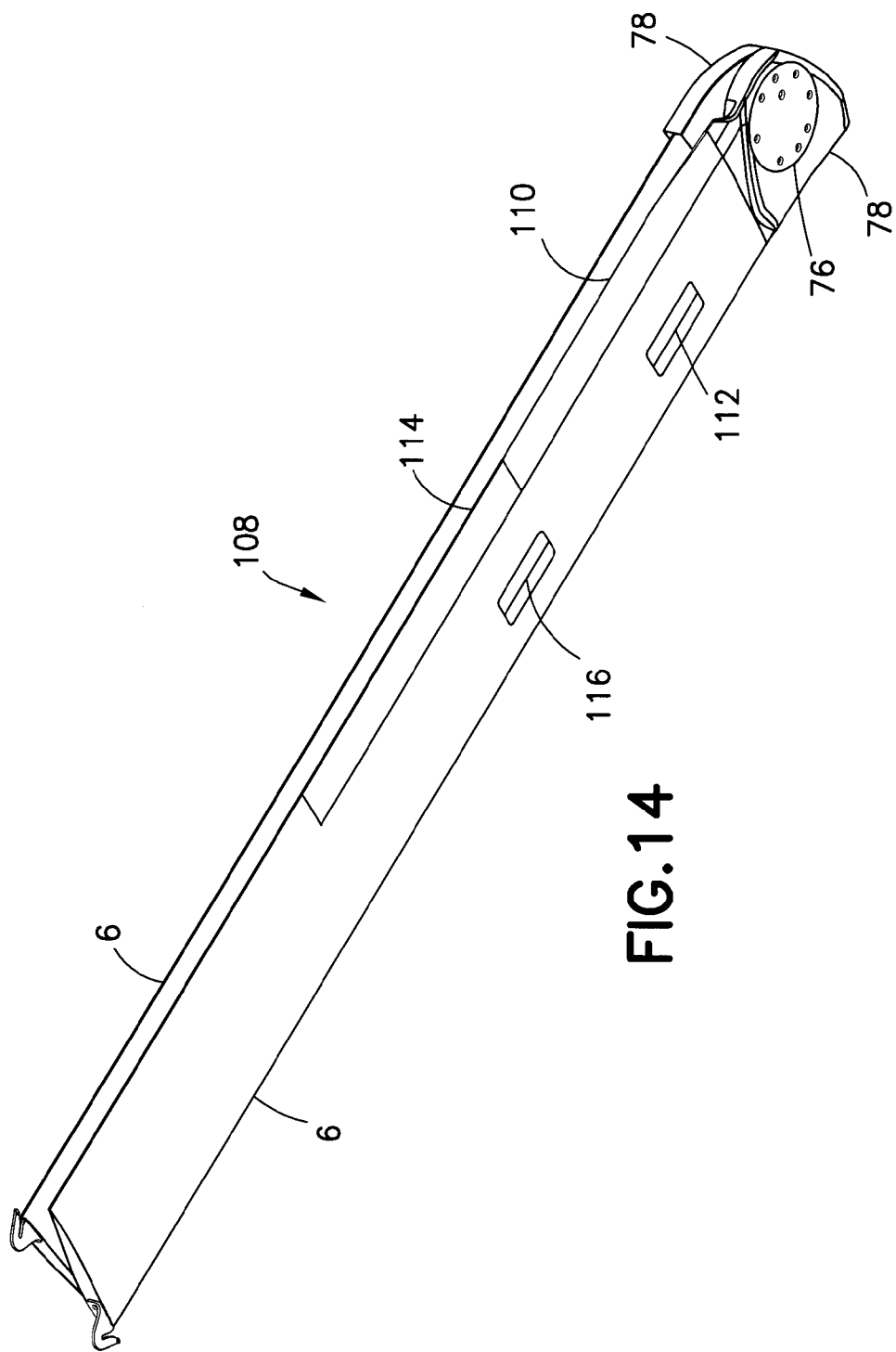
FIG. 14 is a diagram showing an isometric view of folded wings in isolation.

FIG. 14 shows a removable wing assembly 108 in isolation, as compared to FIG. 2 which showed the same wing assembly installed on the fuselage. Each folded wing 6 also has a wing root 78 which is pivotably coupled to a wing root hub 76. Each folded wing 6 also has an inboard flap 110 and an outboard aileron 114 pivotably coupled to the trailing edge of the wing. Flap 110 and aileron 114 can be pivoted relative to the wing 6 under the control of respective control servos 112 and 116 mounted inside the wing. The control servos 112 and 116 (as well as other control servos previously mentioned) are controlled by an onboard controller (not shown in the drawings) situated inside the fuselage. Each control servo is connected to the controller by means of a control servo wire 120 (shown in FIGS. 16 and 17). In accordance with the embodiment shown in FIGS. 15-17, the control servo wires 120 (shown in FIGS. 16 and 17) connecting the control servos 112 and 116 (shown in FIG. 14) on each wing to the onboard controller (not shown) pass through respective control servo wire openings 118 (shown in FIG. 15) in the wing root hub 76.

Figure 15:
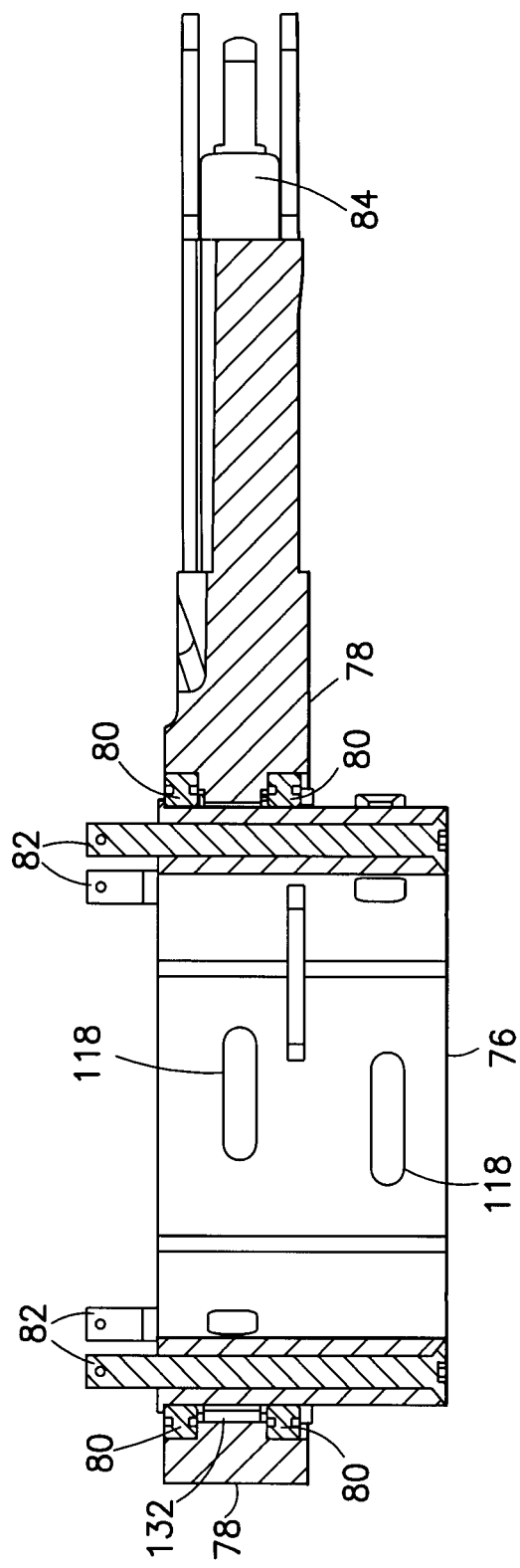
FIG. 15 is a diagram showing a sectional view of a wing deployment mechanism comprising wing roots driven by linear actuators to pivot on x-type bearings about a wing root hub having control servo wire paths.

The sectional view of FIG. 15 shows one wing root 78 pivotably coupled to the upper half of wing root hub 76 by means of X-type bearings 80. The other wing root (not shown) is pivotably coupled to the lower half of wing root hub 76. The wing root hub 76 is attached to the fuselage by means of six high-strength hub attachment bolts 82 (only four are seen in FIG. 15), which pass through holes in the wall of wing root hub 76 and are inserted from outside of the fuselage. This permits the wing assembly to be removed from the fuselage without disassembly of the UAV.

Figure 16:
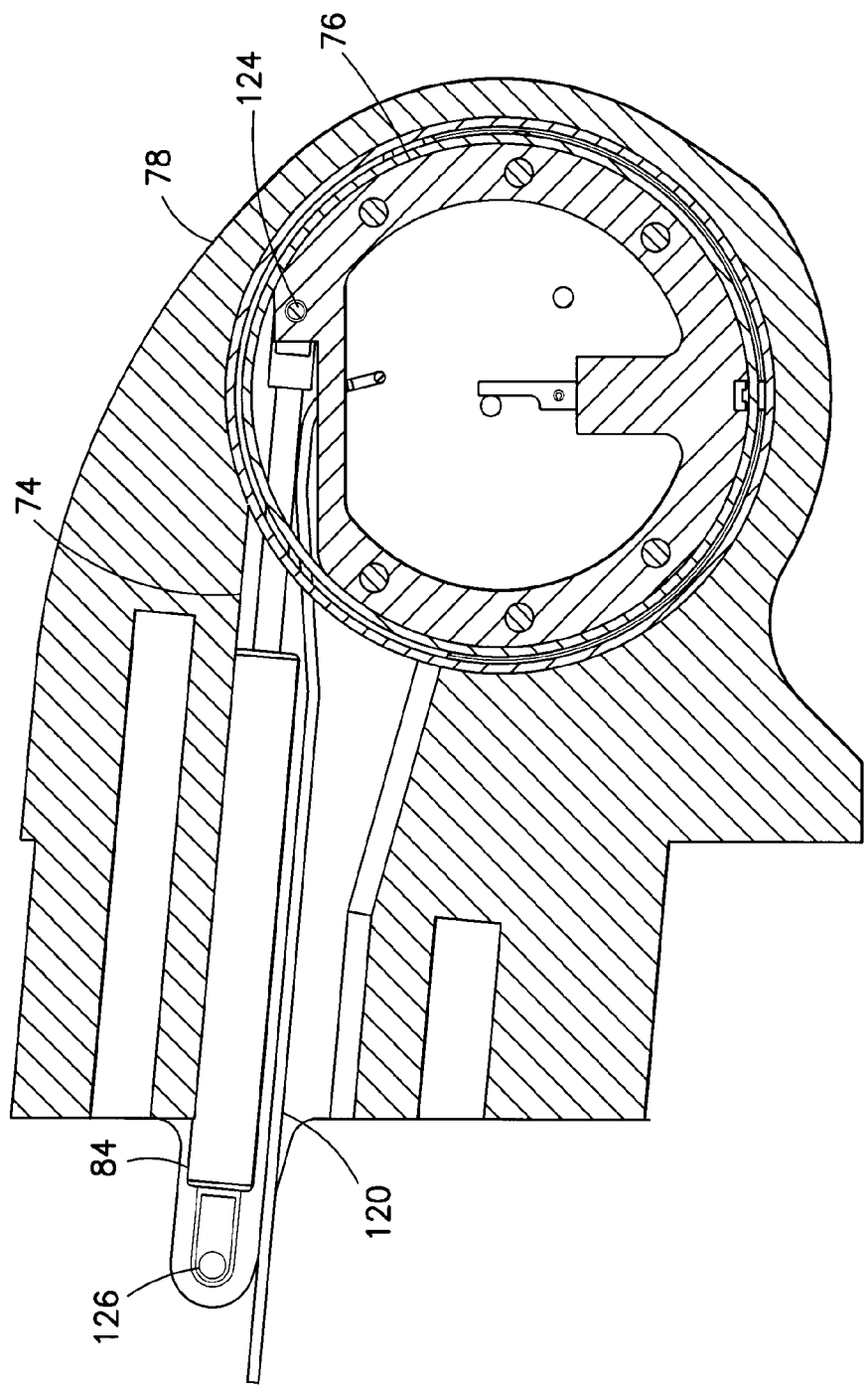
FIGS. 16 and 17 are diagrams showing sectional views of the wing deployment mechanism with control servo wire path in a wing deployed state in FIG. 16 and in a wing stowed state in FIG. 17.
Figure 17:
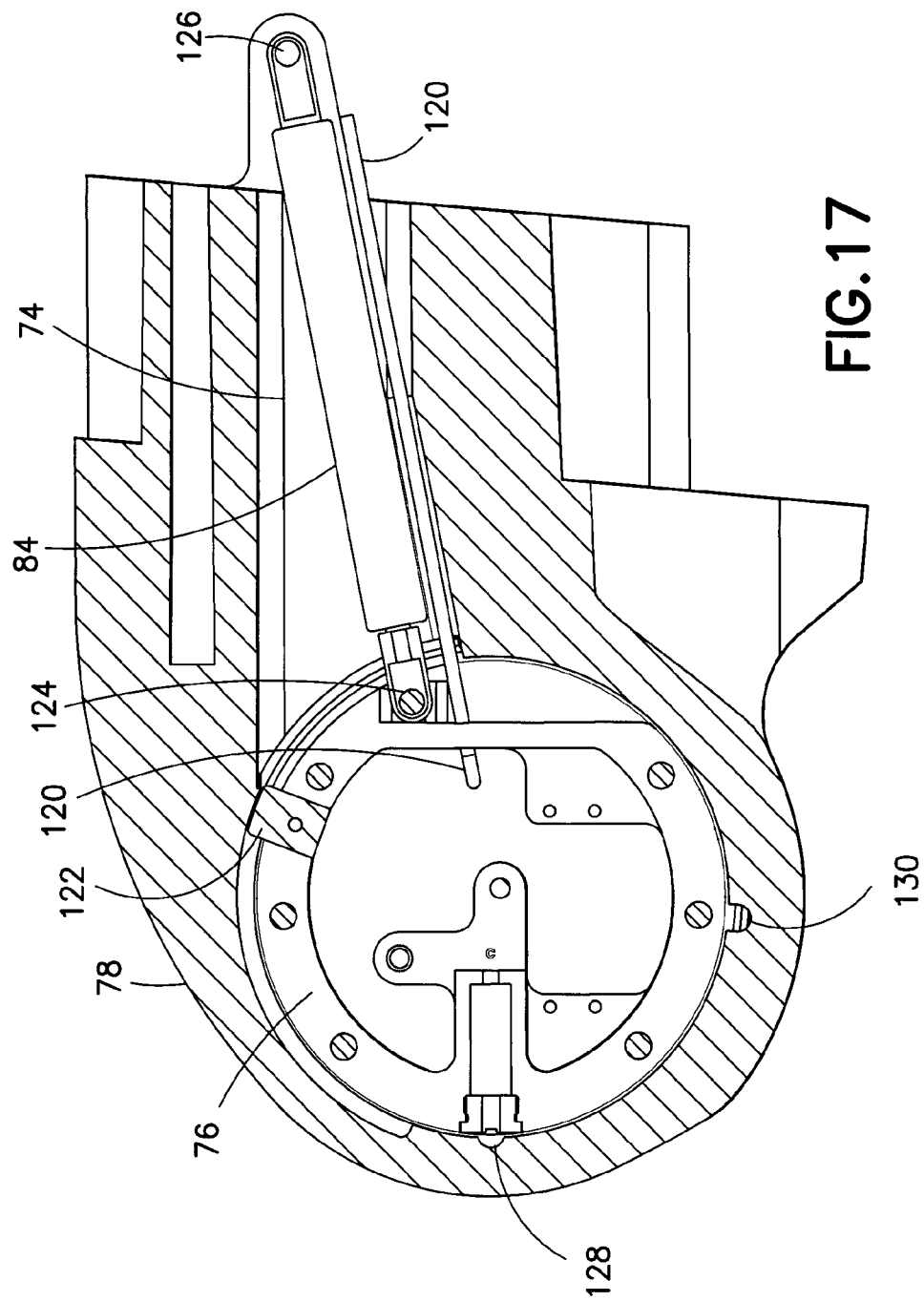

FIGS. 16 and 17 show sectional views of the wing deployment mechanism wing deployed and wing stowed states respectively. The wing deployment mechanism for each wing comprises a large-diameter wing root hub 76, a wing root 78, and a low-profile linear actuator 84 that is mounted internally to the respective wing root. The linear actuator is disposed in a passageway 74 formed in wing root 78. The control servo wire 120 also passes through passageway 74 on its way from the inside of the wing to the interior space of the wing root hub 76.

Still referring to FIGS. 16 and 17, one end of linear actuator 84 is pivotably coupled to the wing root hub 76 by a joint 124 and the other end of linear actuator 84 is pivotably coupled to the wing root 78 by a joint 126. FIG. 16 shows the position of the linear actuator relative to the wing root hub when the wing is deployed; FIG. 17 shows the position of the linear actuator relative to the wing root hub when the wing is stowed. In a wing stowed (i.e., folded) position, the wing root 78 is prevented from rotating by a servo-controlled retractable lock pin (not shown in FIGS. 16 and 17) mounted inside the wing root hub 76 that engages a first slot 128 (see FIG. 17) on the inner periphery of the wing root 78. When the lock pin is retracted by the unlock servo (not shown), the linear actuator 84 rotates the wing root to the deployed position. A stop block 122 attached to the wing root hub 76 and extending radially outward prevents rotation of the wing beyond a desired limit. The retractable lock pin (which has a spring urging it radially outward) will ride the inner surface of the wing root until the wing root reaches the deployed condition and hits the stop block 122, where the spring will urge the lock pin (not shown) to engage a second slot 130 (see FIG. 17) on the inner periphery of the wing root 78, thereby locking the wing root in the deployed position in a well-known manner.

Referring again to FIG. 15, the X-type ball bearings 80 are capable of supporting axial, thrust, and bending loads with very low friction and free play. Since two ball bearings are installed per wing root, an open area between the ball bearings exists in each wing root that permits both the linear actuators and control servo wires to pass between them (see space 132 in FIG. 15). This configuration solves load distribution, free play, and friction problems, as well as the control servo wire routing problem and eliminates the need for a large gas spring within the fuselage or motor power from the UAV to drive the wings open. Additionally, the open space between each X-type ball bearing in the wing roots creates a space to put mechanical "hard stop" stop blocks 122 and locking features in the wing roots.

In summary, when the wing unlock servo is actuated, the lock pins retract permitting the wings to rotate. The linear actuators of the deployment mechanism will then drive the wings open. If electrically powered linear actuators were employed, then power from the UAV would be required to actuate them. The same servo wire path that is used to run servo wires from the wing root to the wings could likewise be used to provide power to the linear actuators.

While various embodiments have been described, it will be understood by those skilled in the art that various changes may be made and equivalents may be substituted for elements thereof without departing from the scope of the teachings herein. In addition, many modifications may be made to adapt a particular situation to those teachings without departing from the essential scope thereof. Therefore it is intended that scope of the claims set forth hereinafter not be limited to the disclosed embodiments.

The invention claimed is:

1. An unmanned aerial vehicle comprising a fuselage, a deployment mechanism supported by said fuselage, and an airfoil-shaped body attached to said deployment mechanism and rotatable between stowed and deployed positions, wherein said deployment mechanism comprises:
first and second links which are pivotably coupled to each other at a first joint,
a third link that is attached to said fuselage and pivotably coupled to said first link at a second joint, and
a fourth link comprising a first portion that is pivotably coupled to said second link at a third joint and a second portion that is pivotably coupled to said third link, said fourth link being rotatable about an axis of rotation,
wherein said airfoil-shaped body is attached to said second portion of said fourth link and is not attached to any of said first, second and third links, and
wherein said airfoil-shaped body can rotate with said fourth link from said stowed position at which said first, second and third joints are not aligned to a deployed position at which said first, second and third joints are aligned.

2. The unmanned aerial vehicle recited in claim 1, wherein said folding airfoil-shaped body comprises a folding canard, further comprising a tension spring that urges said first and second links from an unaligned state to an aligned state.

3. The unmanned aerial vehicle recited in claim 1, wherein said airfoil-shaped body comprises a vertical stabilizer, further comprising a torsion spring that urges said first and second links from an unaligned state to an aligned state.

4. The unmanned aerial vehicle recited in claim 1, wherein said fourth link is pivotable from a first angular position whereat said fourth link does not abut said third link to a second angular position whereat said fourth link abuts said third link as said first and second links move from an unaligned state to an aligned state.

5. The unmanned aerial vehicle recited in claim 1, further comprising a stop bolt attached to said fuselage and a stop bolt covering made of elastomeric material, said stop bolt being positioned so that said first link presses against said stop bolt covering when said first and second links are aligned.

6. The unmanned aerial vehicle recited in claim 1, wherein said first joint is disposed between said second and third joints when said first, second and third joints are aligned.

7. The unmanned aerial vehicle recited in claim 1, wherein said third joint is disposed between said first and second joints when said first, second and third joints are aligned.

8. An unmanned aerial vehicle comprising a fuselage, a first airfoil-shaped body that is rotatably mounted to said fuselage for rotation from a stowed position to a deployed position about a first axis of rotation, an actuation mechanism supported by said fuselage, and a second airfoil-shaped body pivotably coupled to a trailing edge of said first airfoil-shaped body for rotation about a second axis of rotation, wherein said actuation mechanism comprises a motor, a first arm coupled to said motor, a second arm coupled to said second airfoil-shaped body, and a twist link that couples said first and second arms to each other, an angle of said second airfoil-shaped body relative to said first airfoil-shaped body being adjustable in response to movement of said first arm.

9. The unmanned aerial vehicle recited in claim 8, wherein said twist link comprises a threaded rod and first and second rod ends coupled to said threaded rod in a manner such that said first and second rod ends are rotatable relative to each other about an axis of said threaded rod, wherein said first rod end comprises a first ball attached to said first arm and a first socket supporting said first ball.

10. The unmanned aerial vehicle recited in claim 9, wherein said first airfoil-shaped body is a vertical stabilizer and said second airfoil-shaped body is a rudder pivotably coupled to said vertical stabilizer.

11. The unmanned aerial vehicle recited in claim 10, wherein said second rod end comprises a clevis pivotably coupled to said second arm.

12. The unmanned aerial vehicle recited in claim 9, wherein said first airfoil-shaped body is a canard and said second airfoil-shaped body is an elevator pivotably coupled to said canard.

13. The unmanned aerial vehicle recited in claim 12, wherein said second rod end comprises a second ball attached to said other end of said second arm and a second socket supporting said second ball.

14. The unmanned aerial vehicle recited in claim 9, wherein one of said first and second rod ends is rotatable relative to said threaded rod.

15. The unmanned aerial vehicle recited in claim 9, further comprising a deployment mechanism supported by said fuselage, said deployment mechanism comprising a hinge, said first airfoil-shaped body being attached to said deployment mechanism, and said first ball being disposed near a hinge line of said hinge.

* * * * *